INVENTOR:
CHARLES J. SHEARER
BY: Louis J. Bovasso
HIS ATTORNEY

INVENTOR:
CHARLES J. SHEARER
BY: *Louis J. Bovasso*
HIS ATTORNEY

United States Patent Office 3,424,437
Patented Jan. 28, 1969

3,424,437
APPARATUS FOR MIXING VISCOUS FLUIDS
Charles J. Shearer, Yonkers, N.Y., assignor to Shell Oil Company, New York, N.Y., a corporation of Delaware
Filed Aug. 28, 1967, Ser. No. 663,797
U.S. Cl. 259—4                5 Claims
Int. Cl. B01f 7/24; F15d 1/00

ABSTRACT OF THE DISCLOSURE

Apparatus for providing better mixing of viscous fluids by passing the fluids through a plurality of stacked hollow ducts having fixed, helical baffles or flights in each duct, thereby intertwining the fluid streamlines of the flowing fluids as the fluids flow through the hollow ducts and about the fixed helical baffles. The ducts are disposed in staggered rows and can vary in size and placement depending on the viscosity of the fluids being processed.

Background of the invention

A device for use in processing fluids; more particularly, it relates to a device for processing viscous fluids by circulating the fluids through a plurality of stacked ducts having helical baffles or flights fixed in each duct.

In viscous liquid streams, the fluid flow is laminar. When the fluid flow is also steady, the so-called "fluid streamlines" caused by the flowing liquid coincide with particle paths and the fluid material is, therefore, transported along streamlines. For all points on a streamline, the velocity vectors meet the streamline tangentially and therefore no fluid can cross a streamline. For liquids with low values of mass diffusivity and thermal conductivity (e.g., thermoplastics), the streamlines will also be coincident with lines of constant concentration and temperature. Control of concentration and temperature gradients must be achieved by bulk movement of material; i.e., by first subdividing then redistributing the flow streamlines.

Current equipment for the processing of viscous liquid streams (e.g., polymer melts, elastomers, etc.) do not allow for systematic subdivision and redistribution of the flow streamlines. There is great practical difficulty involved in the mixing of highly viscous fluids since the fluid-flow is laminar and has a low Reynolds number. The conventional mixer with spiral paddle and baffles moves the liquid around the mixing chamber, but the flow streamlines do not move significantly relative to one another. Thus, resulting mixing is poor and power requirements are high.

Summary of the invention

It is an object of this invention to provide apparatus having no moving parts for splitting and transposing the fluid streamlines of viscous fluids. If the liquids being mixed are miscible, the fluid streamlines can be shuffled to such a degree that molecular diffusion will complete the mixing process.

The object is carried out by mixing fluids moving in laminar flow by directing the flow of two or more viscous liquids through a series of ducts having helical baffles or flights of 180° displacement fixed in each duct. By proper stacking of these duct-units, the fluid streamlines will move relative to one another, and mixing of the fluids will be achieved. In other words, if a diametrical helical baffle or flight is located in a hollow cylinder, the fluid material flowing through the cylinder will move from one side to the other, and the streamlines will be redistributed.

It is a still further object of this invention to provide a mixer having good heat exchange properties by moving regions of fluids of low temperature to regions of fluids of high temperature through redistribution of the fluid streamlines. Such apparatus will also result in an extended surface of heat exchange along the baffle and duct walls.

If the fluids desired to be mixed are of similar viscosity and flow rate, in an alternate arrangement of ducts, the fluids are passed through a series of stacked ducts of differing diameters.

If the fluids desired to be mixed are of grossly different viscosity and flow rate, a small stream of the low viscosity fluid is introduced at the wall of the apparatus and a large stream of the high viscosity fluid at the center of the apparatus. In this embodiment, the streams of both fluids are passed through a series of rings of ducts, each ring varying in diameter from adjacent the wall of the apparatus to its center. The fluids are then passed through a series of stacked ducts occupying substantially the entire cross-sectional area of the apparatus.

Other objects of this invention will become apparent from the following detailed description and claims and illustrated in the accompanying drawings, which disclose, by way of example, the principles of this invention and the preferred manner of applying these principles.

Description of the preferred embodiments

Figure 1:
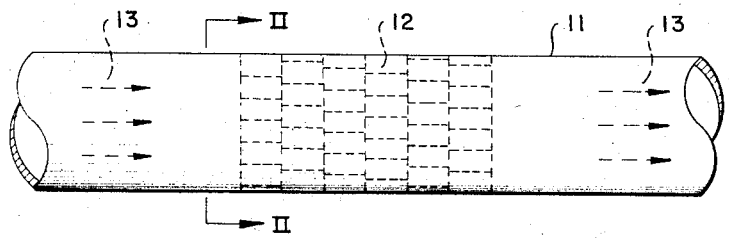
FIGURE 1 is a vertical sectional view of an in-line blender such as a pipeline for carrying out the concepts of the invention.
Figure 2:
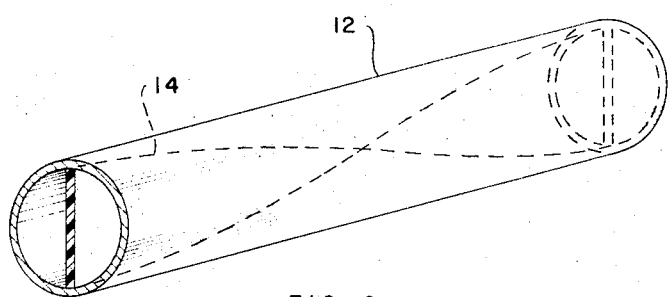
FIGURE 2 is a perspective view of one of the ducts of FIGURE 1.
Figure 3:
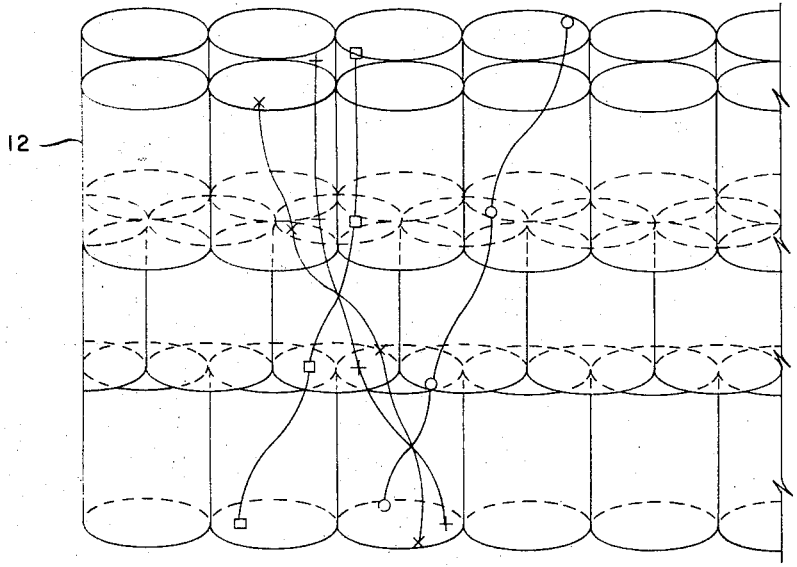
FIGURE 3 is a vertical view of a plurality of stacked ducts 10 illustrating the path of travel of the fluid streamlines.

Referring to the drawings, FIGURE 1 shows an in-line blender such as a pipeline 11 used to convey fluids. A plurality of transverse rows of ducts or short conduit sections 12 occupy substantially the entire cross-sectional area of a section of the pipeline 11. The viscous fluids 13 are introduced into pipeline 11 at one end and pass through ducts 12. The ducts 12 are fixed in pipeline 11 by any known means. Each duct has a helical baffle or flight 14 extending longitudinally of the duct 12 and preferably having a displacement of 180°. In other words, a flat narrow strip of plastic material or the like is twisted or deformed and then permanently set into a helix as seen in FIGURE 2. It is noted that the helical surfaces are generated by a series of straight lines normal to the central axis of the helix. The helical flight 14 is integrally formed or fixedly secured in duct 12 which is preferably a hollow cylindrical unit open at both ends. The longitudinal axes of ducts 12 are parallel to the direction of travel of fluids 13 within pipeline 11; thus, fluids 13 can pass through ducts 12 and flow about the helical flights 14 so that the fluid streamlines caused by flowing fluids 13 intertwine and mix the fluids 13. The ducts 12 in pipeline 11 in the apparatus of FIGURE 1 are disposed in a plurality of vertically staggered successive horizontal rows. Each horizontal row is contiguous to its adjacent horizontal row so that the fluids 13 pass successively through ducts 12 as can be seen in FIGURE 3. In FIG- URE 3, the substantially vertical wavy lines show the path taken by the fluid streamlines of flowing fluids 13. Of course, each duct 12 has a fixed helical flight 14 (not shown). The paths of the fluid streamlines are indicated by appropriate symbols as can be seen in FIGURE 3. Thus, the streamlines indicated as ○ enter the first row of ducts 12 and pass about the helical flights 14, through the second row of ducts 12 and exit at the third row of ducts 12. Here, streamlines ○ have been displaced from their position of original entry and mix with fluid streamlines × and + arriving from various entry points into ducts 12. Thus, the fluid streamlines are subdivided and better mixing is obtained. The ducts 12 of FIGURES 1 through 3 are of the same diameter and length for reasons of economy; however, both the lengths and diameters of ducts 12 may be varied as will be explained more fully infra.

Figure 4:
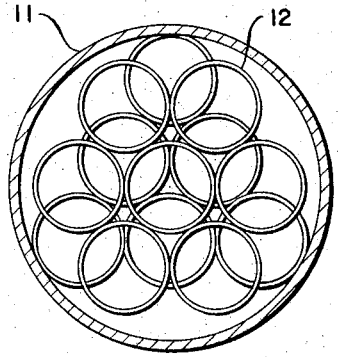
FIGURE 4 is an end view of the blender of FIGURE 1 taken along line II—II of FIGURE 1.

FIGURE 4 shows in detail the overlapping of the first two rows of stacked ducts 12 of FIGURE 1. Row 1 refers to the first row looking in the direction of the flowing fluids 13. Row 2 is the row directly behind the row 1; only rows 1 and 2 are shown for convenience and helical flights 14 have been omitted. It can be seen that the cylindrical ducts 12 are staggered so that fluid passing through the first row of ducts 12 is redistributed into two of the ducts 12 in the second row.

Figure 4A:
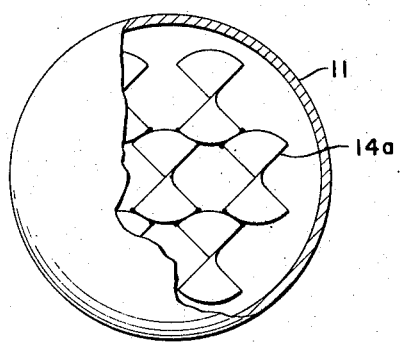
FIGURE 4a is an end view of a modified form of the blender of FIGURE 1.

Although ducts 12 are the preferred method of fixing flights 14 in pipeline 11, flights 14 can be fixedly mounted in pipeline 11 as illustrated in FIGURE 4a. For convenience of illustration, only a portion of flights 14a are shown but it is to be understood that the arrangements of flights 14a would be similar to those mounted in ducts 12 as disclosed hereinabove. Here, flights 14a are supported from the inner wall of pipeline 11 by spot-welding or other suitable means of securement. In this manner, one flight 14a can be spot-welded to another. Also, it is to be understood that one row of flights 14a can be so secured to a preceding row by like means.

Figure 5:
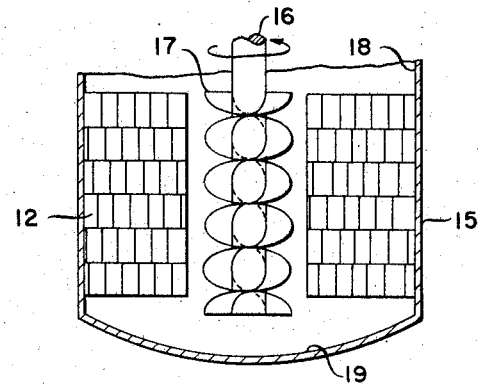
FIGURE 5 is a vertical sectional view of a reactor-mixer for carrying out the concepts of the invention.

FIGURE 5 shows a reactor 15 for mixing viscous fluids. A rotor 16 is centrally mounted in reactor 15 and has a screw portion 17 extending longitudinally of rotor 16 for conveying fluids from the bottom of reactor 15 to the top of the reactor 15. At the same time, screw portion 17 circulates the flowing fluids radially of the longitudinal axis of rotor 16. A plurality of stacked ducts 12 occupy substantially the entire annulus area formed between the inner wall 18 of reactor 15 and the rotor 16, allowing enough space for the screw portion 17 of rotor 16 to rotate freely within the reactor 15. The ducts 12 are the same as the ducts of FIGURE 2; therefore, further explanation is deemed unnecessary. Ducts 12 are also disposed in a plurality of vertically staggered and successive horizontal rows contiguous to one another as in FIGURE 1. The flowing fluids in reactor 15 thus flow about rotor 16 and are conveyed to the top of rotor 16 by screw portion 17. At the same time, screw portion 17 circulates the flowing fluids radially of rotor 16. The fluids then descend through ducts 12 and about helical flights 14 (not shown) in the same manner as discussed above concerning FIGURE 3 since screw portion 17 pumps the liquid from the top to the bottom of reactor 15. The fluids pass out through the bottom row of ducts 12 into the concave bottom wall 19 of reactor 15 where the fluids are recirculated in the reactor 15.

Thus, it can be seen that the apparatus of FIGURES 1 through 5 has considerable use as in-line blender (FIGURE 1) of highly viscous liquids, or as a mixer in polymerization reactors (FIGURE 5).

Figure 6:
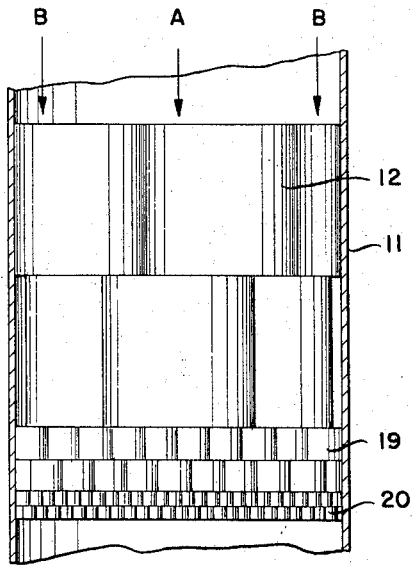
FIGURE 6 is a vertical sectional view of an alternate arrangement of ducts in an in-line blender.

The basic concepts of this invention can be varied according to the types of fluids desired to be mixed. For example, if one desired to blend two streams of fluids of similar viscosity and flow rate, the apparatus of FIGURE 6 may be more desirable. Here, like numerals refer to like parts of FIGURES 1 through 5. In FIGURE 6, pipeline 11 is preferably of 6½ inches in diameter and ducts 12, in the first two rows, are approximately two inches in diameter, assuming the same number of ducts as in FIGURE 4. A viscous liquid is introduced at stream A preferably having a three and a half inch diameter core flowing cocurrently within an annulus of a second liquid of similar viscosity and flow rate in stream B. The first two rows of ducts 12 are staggered as in FIGURE 1 and are substantially as long as they are wide. However, the first two rows of ducts 12 are immediately followed by a contiguous pair of rows of ducts 19 which are substantially smaller in diameter than the first pair of rows of ducts 12.

For example, if the diameter of ducts 12 are 2″, then the diameter of ducts 19 are .66″ and the diameter of ducts 20, a third pair of rows immediately following the contiguous to the second pair of rows of ducts 19, is .22″. The length of ducts 12, 19 and 20, in all cases, is one inch. Experiments have shown that after two passes through a stacking of two-inch diameter ducts (as, for example, the pipeline 11 of FIGURE 1) the patch size or cross-sectional area of liquid A is reduced nine times; the patches are evenly distributed over the blender cross section. After six passes through the successive smaller diameter ducts of FIGURE 6, the patch size of liquid A is reduced $9^3$ times or approximately two millimeters in diameter. Thus, the power consumption for this type of mixer is much lower than the power consumption of a conventional in-line mixer. Of course, each duct 12, 19 and 20 contains a like helical baffle or flight 14.

Figure 7:
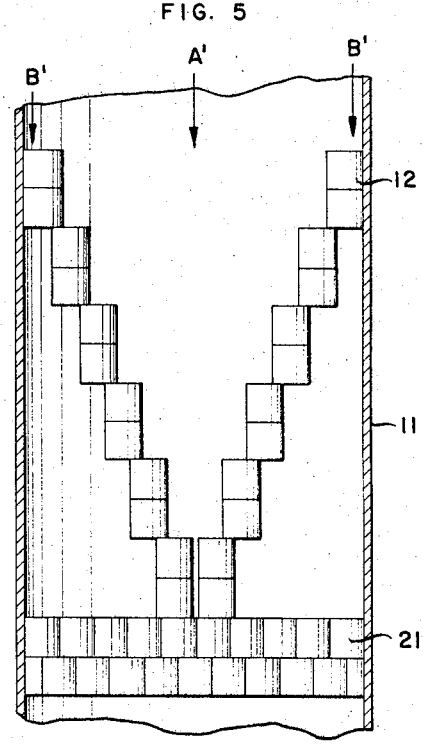
FIGURE 7 is a vertical sectional view of a further arrangement of ducts in an in-line blender.

If one desired to blend a small stream of liquid of low viscosity and flow rate with a large stream of liquid of grossly higher viscosity and flow rate, it is known from fluid mechanics considerations that it is unsatisfactory to introduce the small stream at the center of the pipeline 11. Instead, it should be introduced adjacent the wall of pipeline 11 where its cross-section will be larger as shown in FIGURE 7. Here, the ducts 12 are arranged in a plurality of pairs of rows of rings of decreasing diameter. Thus, a first pair of rows are adjacent to the inner wall of pipeline 11; preferably, the first pair of rows comprises staggered ducts 12 each having a fixed helical baffle or flight 14 (not shown). Each successive pair of rows of ducts are disposed in rings of decreasing diameter as shown in FIGURE 7. The rings of rows of ducts 12 adjacent the central longitudinal axis of pipeline 11 are of the smallest diameter. A pair of rows of stacked ducts 21 are contiguous to the last rings of ducts 12. Ducts 21 are also staggered as in FIGURE 1; a plurality of staggered rows of ducts 21 may be provided, if desired. Thus, the stacking arrangement of FIGURE 7 blends the two streams of liquids as follows: Small stream B′ of low viscosity is introduced adjacent the inner wall of pipeline 11. The passage of the fluid material through the rings of rows of ducts 12 and about the helical flights 14 (not shown) takes stream B′ from adjacent the inner wall of pipeline 11 to the center of pipeline 7. Stream A′ of high viscosity is introduced at the center of pipeline 11 and flows axially through ducts 12 and about helical flights 14. Both streams A′ and B′ converge at the rows of stacked ducts 21 which occupy substantially the entire cross-sectional area of a section of pipeline 11. Of course, some of the fluid from stream B′ will pass along the inner wall without traversing all of the ducts 12; however, all the fluid from stream B′ will pass through staggered ducts 21, the particular number of rows of ducts 21 being a matter of choice depending upon the viscosity of the liquids involved. In summary, passage of material through the ducts 12 of the apparatus of FIGURE 7 takes stream B′ from the wall to the center, and the remaining fluid moves axially through the ducts 12 such that the concentration of stream A′ and B′ is even over its cross-section.

Thus, streamline redistribution of two viscous fluids is accomplished by passing the liquid stream through a duct having a fixed diametrical helical flight or baffle. In all embodiments, the ducts may be eliminated and the helical flights or baffles secured to one another as discussed above concerning FIGURE 4a. If the flow is allowed to pass through a stacked array of such ducts, streamline subdivision will also be obtained; the streamlines will be interlaced and blending of the two fluids will be achieved. As blending proceeds, a cross-section taken through the liquid stream will show patches of one liquid distributed in the other. Various stacking configurations will produce blending; for optimum blender performance, the stacking configuration should probably satisfy the criterion of maximum degree of dispersion for minimum residence time (i.e., the length of time the fluid remains in the apparatus) for a tolerable power consumption as in the stacked arrays disclosed in this invention. As a heat exchanger, the helical flighted ducts offer extended surfaces for heat transfer. Also, the redistribution of liquid from the wall of the casing to its center will reduce the tendency of channeling and expose new fluid material to the transfer surface.

Although specific embodiments of the invention have been described, many modifications and changes may be made therein without departing from the scope of the invention as defined in the appended claims.

I claim as my invention:

1. Apparatus for mixing highly viscous fluids comprising:
   a casing adapted to convey highly viscous fluids while said fluids are flowing within said casing, said flowing fluids adapted to form fluid streamlines within said casing;
   a plurality of helical flights fixed within said casing;
   each of said helical flights having its longitudinal axis parallel to the direction of travel of fluids flowing within said casing whereby said flowing fluids passing through said casing and about said helical flights mix said fluids by intertwining the fluid streamlines along the axes of flow of said fluids within said casing;
   each of said helical flights being fixedly mounted within a hollow duct,
   said ducts being open at both ends and fixedly mounted in said casing,
   said ducts having their longitudinal axes parallel to the direction of travel of fluids flowing within said casing,
   said ducts being disposed in a plurality of vertically staggered successive horizontal rows; and
said casing having a fluid inflow end and a fluid outflow end and wherein said rows of ducts comprise a succession of progressively smaller diameter ducts from the inflow end of said casing to the outflow end.

2. Apparatus as in claim 1 wherein said helical flights have a displacement of 180°.

3. Apparatus as in claim 1 wherein said casing is an in-line blender and at least a group of said ducts occupy substantially the entire cross-sectional area of a section of said blender.

4. Apparatus as in claim 1 wherein said succession of progressively smaller diameter ducts comprises a pair of rows of ducts of the same diameter followed by a plurality of pairs of rows of ducts of progressively smaller diameter than the preceding pair of rows, all of the ducts in each pair of rows being of the same diameter.

5. Apparatus as in claim 1 wherein said succession of progressively smaller diameter ducts comprises a plurality of successive rows of ducts of the same diameter disposed in rings of progressively smaller diameter from adjacent the inner wall of said casing to adjacent the central longitudinal axis of said casing, each ring being contiguous to its preceding ring, and a plurality of ducts of smaller diameter than the rings of ducts immediately following the ring of ducts adjacent the central longitudinal axis of the casing and disposed in a plurality of vertically staggered successive horizontal rows occupying substantially the entire cross-sectional area of said casing.

References Cited

UNITED STATES PATENTS

| | | | |
|---|---|---|---|
| 1,720,549 | 7/1929 | Gilchrist | 259—97 |
| 1,770,208 | 7/1930 | Kemnal. | |
| 2,542,587 | 2/1951 | Smith. | |
| 3,286,992 | 11/1966 | Armeniades et al. | 259—4 |

FOREIGN PATENTS 27,412   3/1921   Denmark.

WALTER A. SCHEEL, *Primary Examiner.*

JOHN M. BELL, *Assistant Examiner.*

U.S. Cl. X.R.

259—180, 97; 138—42